UNITED STATES PATENT OFFICE.

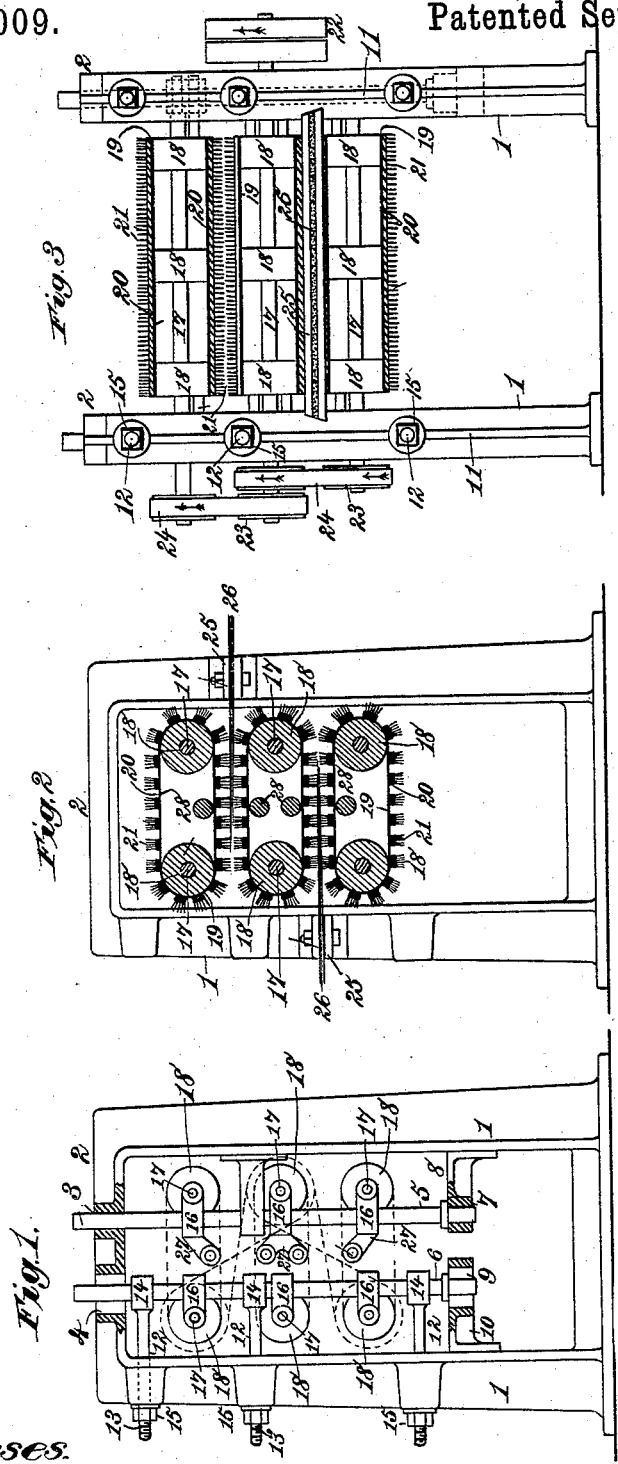

FRIDA KUNZ, OF DONAUESCHINGEN, GERMANY.

APPARATUS FOR PREPARING FIBER FOR THE MANUFACTURE OF BRUSHES AND BROOMS.

SPECIFICATION forming part of Letters Patent No. 305,009, dated September 9, 1884.

Application filed June 4, 1884. (No model.)

*To all whom it may concern:*

Be it known that I, FRIDA KUNZ, a citizen of Germany, residing at Donaueschingen, Empire of Germany, have invented new and useful Improvements in Apparatus for Preparing Fiber for the Manufacture of Brushes and Brooms, of which the following is a specification.

This invention relates to improvements in the apparatus for preparing fiber for the manufacture of brushes and brooms, for which Letters Patent No. 295,021 were issued to me March 11, 1884.

The object of my present invention is to provide a novel machine whereby I am enabled to more successfully manufacture artificial bristles from cocoa fiber for the production of brushes and brooms.

The invention consists in the construction and combination of devices hereinafter described and claimed, reference being had to the accompanying drawings, in which—

Figure 1 is an end elevation of a machine embodying my invention; Fig. 2, an end view, partially in section; and Fig. 3, a side elevation, partially in section.

In the drawings, the numbers 1 1 indicate two end standards, joined at the top by a cross-bar, 2, which is provided with a cylindrical bearing, 3, and a slotted bearing, 4, for the upper ends of two vertical rods, 5 and 6, the lower end of the one, 5, resting in a cylindrical bearing, 7, in a bracket, 8, and the lower end of the other, 6, resting in a slotted bearing, 9, in a bracket, 10, said brackets being attached to the supporting-standards, and the rod 6 being capable of bodily movement in its slotted bearings toward and from the other rod, 5. The standards 1 and cross-bar 2 constitute one end supporting-frame, there being another similar one at the other end. The supporting-frames are each provided with a vertical slot, 11, through which pass the horizontal bars 12, having screw-threaded outer ends, 13, and bearings 14 at their inner ends, for the movable rod 6, the threaded ends being provided with screw-nuts 15, by which the bars can be adjusted in the direction of their length to move the rod 6 toward or from the rod 5, and on each of the rods is mounted a series of bearing-blocks, 16—three in number, as here shown—which constitute bearings for the journal ends of shafts 17, provided with attached circular disks 18, which support the endless bands or aprons 19. The aprons are provided in any suitable manner with brush-surfaces, as here shown, consisting of transverse strips 20, secured to the bands or aprons, and having attached bristles 21, and the respective aprons are arranged in such proximity to each other that in their traveling movement the brushes on one come in contact with, or nearly so, the brushes on the adjacent apron. A driving-pulley, 22, is fixed to the end of one of the shafts at one end of the machine, and at the opposite end the shafts are geared together, as by pulleys 23 and bands or belts 24, so that the brush-aprons are preferably all caused to travel in one direction. The tension or tautness of the aprons is controlled by adjusting the vertical rod 6 toward or from the other rod, 5, and the relative position of the aprons can be changed by adjusting the bearing-blocks 16 on the said rods through the medium of set-screws or otherwise.

A pair of clamps or tongs, 25, is adapted to be supported at each side of the machine between the end frames, for clamping and holding one end of the cocoa fibers 26 throughout the entire width of the endless aprons, the fibers held by each pair of clamps or tongs being inserted between two adjacent aprons in such manner that in their traveling movement the brushes grind or rub off the fibers toward their points, thereby pointing and polishing the fibers to produce the artificial bristles, which may be greased or oiled, as in my Letters Patent alluded to, if such be desired. The friction incident to the traveling movement of the brushes against the fibers imparts heat to the latter, and thereby sets free the natural oil contained therein, which materially facilitates the manufacture.

The adjustment of the aprons relatively to each other to vary the space intervening between two adjacent aprons is advantageous, in that it enables the pressure on the bunches of fiber to be varied, and also permits bunches of greater or less thickness to be operated upon. The apron can be caused to travel in any suitable direction—as, for example, in opposite directions alternately.

The bearing-blocks 16 on the rod 5 are provided with arms 27, forming journal-bearings for the ends of rollers 28, which extend through the aprons and support the same between the pairs of shafts.

I do not confine myself to three aprons, as two are sufficient; nor do I confine myself to any special means for holding the fibers between the adjacent surfaces of the aprons.

Having thus described my invention, what I claim is—

1. A machine for polishing and pointing fibers to produce artificial bristles for brushes and brooms, combining in its structure supporting end frames, pairs of revolving shafts, and an endless traveling apron supported on each pair of shafts, and provided with brush-surfaces to grind or rub and thus polish and point the fibers held between the adjacent brush-surfaces of the aprons, substantially as described.

2. The combination of supporting end frames, the rods, the bearing-blocks thereon, the pairs of shafts supported by the blocks, the endless apron around each pair of shafts, and the brushes on the surfaces of the aprons, substantially as described.

3. The combination of the supporting end frames, the rods, the adjustable bearing-blocks thereon, the pairs of shafts supported by the blocks, the endless apron around each pair of shafts, and the brushes on the surface of each apron, substantially as described.

4. The combination of the supporting end frames, the rods, one adjustable toward and from the other, the bearing-blocks on the rods, the pairs of shafts supported by the blocks, the endless apron around each pair of shafts, and the brushes on the surface of each apron, substantially as described.

In testimony whereof I have hereunto set my hand in the presence of two subscribing witnesses.

FRIDA KUNZ.

Witnesses:
EDUARD RETTICH,
C. L. JUL. BAUMANN.